Patented July 13, 1943

2,323,898

UNITED STATES PATENT OFFICE 2,323,898

UREA-ALDEHYDE-HALOGENATED ACETONE CONDENSATION PRODUCT

Gaetano F. D'Alelio, Pittsfield, Mass., assignor to General Electric Company, a corporation of New York No Drawing. Application August 9, 1939, Serial No. 289,276

13 Claims. (Cl. 260—42)

This invention relates to new condensation products and to methods of making the same. The invention is concerned more particularly with self-curing aminoplasts, by which are meant heat-convertible resinous condensation products prepared from amino or amido compounds and having the inherent characteristic of curing under heat or under heat and pressure to the insoluble, infusible state without the addition of a curing accelerator or catalyst.

In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing ingredients comprising a urea, an aliphatic aldehyde, for example formaldehyde, and a halogenated ketone, more particularly a halogenated acetone, e. g., chloroacetone (monochloroacetone), dichloroacetone, bromoacetone (monobromoacetone), etc. The initial condensation may be carried out at normal or at elevated temperatures, in the presence or absence of a condensation catalyst and under alkaline, neutral or acid conditions.

The urea component may be, for instance, urea ($NH_2CONH_2$) itself; thiourea; iminourea (guanidine); aldehyde-reactable substituted ureas, thioureas and iminoureas such as methyl urea, acetyl urea, benzoyl urea, phenyl thiourea, asymmetrical diethyl urea, allyl urea, 2-chloroallyl urea, ethylidene urea, methylol urea, methylene urea, dicyandiamide, guanylurea, guanylthiourea, biguanidine, aminoguanidine, creatine (guanidine methyl glycine) and guanoline (guanido carbonic ethyl ester). Terms such as "a urea," "urea component" and "urea substance," as used generally herein and in the appended claims, are intended to include within their meaning substances of the kind above mentioned. Other examples of aldehyde-reactable compounds that may be used are creatinine, aminotriazoles, ethylene pseudosulfocarbamide derivatives, sulfohydantoin and aldehyde-reactable triazine derivatives.

Compositions comprising a condensation product of ingredients comprising an aminotriazine, an aldehyde and a halogenated acetone are more fully described and are specifically claimed in my copending application Serial No. 374,561, filed January 15, 1941, which application is a continuation-in-part of the present case and is assigned to the same assignee as the instant application.

In producing the new condensation products, which may be described more specifically as co-condensation products, the choice of the aliphatic aldehyde component is dependent largely upon economic considerations and upon the particular properties desired in the finished product. I prefer to use as the aldehydic component formaldehyde or compounds engendering formaldehyde such as paraformaldehyde, hexamethylenetetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general the longer the chain of the aliphatic aldehyde, the slower the cure of the resinous condensation product and the softer is the final product.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced price is of considerable commercial importance.

As a result of my invention the difficulties attendant the production of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of material, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aliphatic aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction is then caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the halogenated ketone to a partial condensation product of a urea and an aliphatic aldehyde and effect further condensation between the components. Or, I may first condense the halogenated ketone with an aliphatic aldehyde, add the resulting product to a urea-aliphatic aldehyde partial condensation product and then cause the reaction to proceed further. Or, I may condense or partially condense a halogenated ketone with a mole excess of an aliphatic aldehyde, add a urea to this condensation product and effect further reaction between the components. Or, I may partially condense a halogenated ketone with an excess of a urea and add to this condensation product one mole of an aldehyde for each mole excess of urea present and effect further condensation. Still other ways may be employed in combining the components and in producing the unmodified and modified condensation products of this invention, as will be readily understood by those skilled in the art as the description of the invention proceeds. These condensation reactions may proceed under a wide variety of time, temperature and pressure conditions. The temperature of reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified and unmodified resinous masses are self-convertible under heat or under heat and pressure to the insoluble infusible state.

Depending upon the particular reactants employed and the particular conditions of reaction, these intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. The liquid compositions may be used, for instance, as surface-coating materials, in the production of paints, varnishes, lacquers, enamels, etc., for general adhesive applications, as anti-creasing agents, in producing laminated articles, and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration.

*Example 1*

| | Parts by weight |
|---|---|
| Urea | 60.0 |
| Aqueous ammonia (28%) | 7.6 |
| Aqueous formaldehyde (37.1% approximately) | 161.0 |
| Sodium hydroxide (in 15 parts of water) | 0.06 |
| Chloroacetone (monochloroacetone) | 1.0 |

The above components were mixed in the order given and refluxed for 1 minute. The resulting clear, hot syrup was mixed with 70 parts alpha flock and 0.5 part zinc stearate to form a molding compound. The compound was dried at 50° C. Molded articles of good color and good water resistance were obtained when the compound was molded at 130° C. under pressure.

*Example 2*

Same formula as in Example 1. All of the components with the exception of the halogenated acetone, specifically chloroacetone, were mixed and heated under reflux for 20 to 30 minutes. Then the chloroacetone was added and the mass refluxed for 20 minutes to effect further condensation. The clear hot syrup was mixed with alpha flock and zinc stearate as described under Example 1. The compound was dried 4 hours at 50° C. Molded articles similar to those of Example 1 were obtained by shaping and hardening the compound under heat and pressure.

Example 3

| | Parts by weight |
|---|---|
| Urea | 60.0 |
| Aqueous ammonia (28%) | 7.6 |
| Aqueous formaldehyde (37.1% approximately) | 161.0 |
| Sodium hydroxide (in 15 parts of water) | 0.06 |
| Alpha, alpha prime dichloroacetone | 0.3 |

The above components were mixed and heated under reflux for less than 1 minute. The resulting clear, hot syrup was mixed with 70 parts alpha flock and 0.4 part zinc stearate to form a molding composition. The compound was dried at 50° C. for 13 hours. Molded articles of exceptional translucency and uniformity of structure were obtained. This compound has excellent curing properties.

Example 4

Same formula as in Example 3 except that 1 part alpha, alpha prime dichloroacetone (sym. dichloroacetone) was used. All of the components with the exception of the said dichloroacetone were mixed and heated under reflux for 20 to 30 minutes. The hot syrup was compounded with 70 parts alpha flock and 0.5 part zinc stearate. The compound so prepared was dried. An alcoholic solution of the stated amount of alpha, alpha prime dichloroacetone was added to the dried mass, which was heated to effect further condensation. Molded articles were produced from the resulting composition under heat and pressure. The molded pieces so obtained were surprisingly hard and of a good color.

Example 5

Same formula as in Example 3 except that 1 part alpha chloroacetophenone was used instead of alpha, alpha prime dichloroacetone. All of the components except the alpha chloroacetophenone were mixed and refluxed for 20 to 30 minutes. Then the alpha chloroacetophenone was added and the mass heated under reflux for about 10 minutes to effect further condensation. The clear hot syrup was mixed with alpha flock and zinc stearate as described under Example 3 to form a molding composition. The compound thus prepared was dried at 50° C. The articles obtained by molding at 130° C. under pressure had good surface hardness and were translucent white in color. The composition cured rapidly.

Example 6

Same formula as in Example 3, except that 1 part alpha chloroacetophenone was used instead of the alpha, alpha prime dichloroacetone. The components were mixed and refluxed for 1 minute. The resulting clear, hot syrup was mixed with alpha flock and zinc stearate to form a molding composition. The compound was dried at 50° C. Molded pieces obtained by molding at 130° C. under a pressure of 2000 to 3000 pounds per square inch were exceptionally uniform in composition and in resistance to the action of water.

Example 7

Same formula is in Example 3 except that 2 parts of alpha chloroacetophenone were used instead of the alpha, alpha prime dichloroacetone. All of the components with the exception of the alpha chloroacetophenone were mixed and heated under reflux for 20 to 30 minutes. The syrup was compounded with alpha flock and zinc stearate and dried at 50° C. An alcoholic solution of the alpha chloroacetophenone was then added and the alcohol-moist compound heated to effect further condensation. The dried molding compound formed, under heat and pressure, molded articles similar to those of Example 6.

Example 8

| | Parts by weight |
|---|---|
| Urea | 60.0 |
| Aqueous ammonia (28%) | 7.6 |
| Aqueous formaldehyde (37.1% approximately) | 161.0 |
| Sodium hydroxide (in 15 parts of water) | 0.06 |
| Alpha bromoaceto-para-bromophenone | 2.0 |

The above components with the exception of the alpha bromoaceto-para-bromophenone were mixed and refluxed for 20 to 30 minutes. Sixty-one (61) parts alpha flock and 0.4 part zinc stearate were mixed with the resulting syrup, after which the compound was dried. An alcoholic solution of the bromophenone was added and the alcohol-moist compound heated to effect further condensation. The dried compound, when molded under heat and pressure, formed good molded articles.

Condensation products of urea and formaldehyde alone, prepared as described under Examples 1 to 8 inclusive, but not intercondensed with the specific halogenated ketone mentioned in the individual example, are heat-non-convertible. In other words, they will not cure under heat or under heat and pressure to the insoluble infusible state.

It will be understood, of course, that the halogenated ketones mentioned in the above examples are only by way of illustration and that various other halogenated ketones, more particularly halogenated acetones, may be used in carrying this invention into effect, e. g., monobromoacetone, dibromoacetone, tribromoacetone, etc.

When high boiling halogenated ketones are added to a partially condensed urea-formaldehyde syrup and not refluxed but are heated to effect condensation simultaneously with drying, good curing resins are obtained. When low boiling halogenated ketones are used in this way, the halogenated ketone tends to distill off before the condensation reaction is complete. In practicing my invention I prefer to use in large part low boiling ketones, such as chloroacetone. Therefore it is desirable that these compounds be condensed into the mass under reflux.

It also will be understood that in each of the specific halogenated ketones above mentioned the particular halogen specified may be replaced by some other halogen, care being taken in the choice of the halogen in the light of the properties desired in the final products. For example, when light-colored molded articles are desired, the use of iodoketones should be avoided and when the heat-convertible resins are to be used in the production of molding compositions, the fluoroketones preferably are avoided.

Where a plurality of halogen atoms are present in the ketone molecule, these may be the same or different. For example, one halogen in the molecule may be chlorine and another bromine. In this way it is possible to obtain a heat-convertible resin of self-curing characteristics and other properties best adapted to meet a particular molding problem and service application of the finished article.

In certain cases, it may be advantageous to use a single halogenated ketone with a plurality of urea substances. Thus, to modify the characteristics of the molded product I may use a mixture of, for example, a thiourea and a triazine derivative, or urea and dicyandiamide, with a single halogenated ketone. In other cases, instead of using a single halogenated ketone, I may use a plurality of halogenated ketones with a single urea substance or with a plurality of urea substances.

The ratio of the reactants to each other may be considerably varied. In general, it is desirable to use at least one mole of an aliphatic aldehyde for each mole of mixed (total) ketone and urea substance, or at least one mole of mixed (total) aliphatic aldehyde and ketone for each mole of urea substance. In producing the heat-convertible resinous condensation products of this invention, the proportion of halogenated ketone in all cases is at least sufficient to impart self-curing characteristics to the resin. Ordinarily not exceeding substantially ¼ mole halogenated ketone is used for each mole of urea substance. No advantage accrues from using an amount of halogenated ketone above the minimum required to secure the desired curing rate. Further, the use of higher amounts of halogenated ketone is undesirable for most molding applications because of the greater difficulty in obtaining molded articles of suitable hardness, but may not be objectionable for other applications of the material. Also, in some cases, particularly where high molecular weight halogenated ketones, as for example alpha halogenated methyl octadecyl ketone, are used, the halogenated ketone portion of the molecule exceeds on a weight basis the urea portion of the molecule. Consequently, in such cases the inherent characteristics (for example, waxy nature) of the high molecular weight halogenated ketone predominate in the resin molecule. This may be objectionable in some applications of the molded part, for example where resistance to the ordinary organic solvents is required.

From the foregoing it will be seen that the particular mole ratio of halogenated ketone to the other components is dependent somewhat upon the inherent characteristics of the halogenated ketone and the curing characteristics and other properties desired in the heat-convertible and heat-hardened resinous condensation products. For molding applications the ratio of the aliphatic aldehyde to urea substance may be considerably varied, but generally will be within the range of 1½ to 2½ moles aliphatic aldehyde for each mole of urea substance. No particular advantage ordinarily accrues from the use of higher amounts of aldehyde. Approximately 2 moles aliphatic aldehyde per mole urea substance usually gives very satisfactory results, particularly from the view point of optimum yields of condensation product per unit cost.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acrylamides, benzamide, toluene sulfonamide, etc.; polyamides such as adipic diamide, phthalamide and the like; amines, such as ethylene diamine, aniline, phenylene diamine, amino phenols, etc.

The modifying bodies also may take the form of high molecular weight bodies, with or without resinous characteristics, for example partially hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper and the like) may be incorporated into the compositions to alter the visual appearance and the optical properties of the finished product. Mold lubricants such as the metallic soaps of the high molecular weight fatty acids, for example the stearates and palmitates of tin, zinc., etc., waxes such as carnauba, high melting point paraffin waxes, etc., may be added to facilitate molding of the composition. Various fillers may be used to provide a wide variety of molding compositions. The choice of the filler depends upon the particular application for which the molded article is to be used. As fillers may be used, for instance, bleached or unbleached wood flour, alpha cellulose in flock form, sheets or cuttings of paper, cloth, canvas, etc., asbestos in powdered or long or short fiber length, powdered or flaked mica, wood chips, short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above addition agents in accordance with procedures well known to those skilled in the plastics art. The wet composition may be dried in the usual manner either at normal (room) temperature or at elevated temperatures in a preheated stream of air or under the influence of reflected heat energy. The dried compound may be densified through the usual processes of working in a Banbury mixer, or by rolling, pelleting or other means, followed by grinding and screening to the desired particle size. These molding compositions may be molded at elevated temperatures, preferably between 100° and 150° C., and at suitable pressures. The molding pressures generally range between about 1000 and about 4000 pounds per square inch, more particularly from about 2000 to 3000 pounds per square inch.

In addition to their use in molding compositions, the condensation products of this invention are especially suitable for use as fire retardants, water repellents and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble infusible (cured) state. The cellulosic or other fibrous materials to be treated may be surface coated or both coated and impregnated by any suitable means, for example by spraying with, or immersing in, a solution of the treating agent and thereafter removing the solvent.

The modified and unmodified products of this invention have a wide variety of other use, for instance in making buttons, clock cases, radio cabinets, dishes and other household utensils, decorative novelties and various other cast, molded and laminated articles of manufacture. They may be used in making arc-extinguishing tubes capable of evolving an arc-extinguishing gas under the heat of the arc, in the production of wire or baking enamels, and for bonding or cementing together mica flakes to form a laminated mica article. They also may be used in making laminated fibrous sheet materials wherein superposed layers of cloth, paper, etc., are firmly bonded together with the resin, as impregnants for electrical coils and other electrical devices, and for other purposes.

What I claim as new and desire to secure by Letters Patent of the United States is:

1. A composition of matter comprising an alcohol-modified condensation product of ingredients comprising a urea, an aliphatic aldehyde and a halogenated acetone.

2. A heat-convertible resinous condensation product of a mixture comprising a urea, an aliphatic aldehyde and a halogenated acetone.

3. A heat-curable resinous composition comprising a soluble, fusible condensation product of ingredients comprising the following components in the stated molar ratios: 1 mole of a urea, at least one mole of formaldehyde and not exceeding substantially ¼ mole of a halogenated acetone.

4. A product comprising the cured resinous condensation product of ingredients comprising a urea, an aliphatic aldehyde and a halogenated acetone.

5. A condensation product of a mixture comprising a urea, an aliphatic aldehyde and a chlorinated acetone.

6. A molding composition comprising a filler and a soluble, fusible resinous condensation product of ingredients comprising the following components in the stated molar ratios: 1 mole urea, at least 1 mole formaldehyde and not exceeding substantially ¼ mole monochloroacetone.

7. The method of producing a new resinous condensation product which comprises reacting to resin formation ingredients comprising the following components in the stated molar ratios: 1 mole of a urea, at least 1 mole of an aliphatic aldehyde and not exceeding substantially ¼ mole of a halogenated acetone.

8. The method which comprises effecting reaction between ingredients comprising a urea, an aliphatic aldehyde and a halogenated acetone.

9. A resinous composition obtained by reaction of a mixture comprising (1) a halogenated acetone; and (2) a partial condensation product of ingredients comprising a urea and an aliphatic aldehyde.

10. A resinous composition obtained by reaction of a mixture comprising (1) a halogenated acetone and (2) an alkaline-catalyzed partial condensation product of ingredients comprising a urea and formaldehyde.

11. A resinous composition obtained by reaction of a mixture comprising (1) a chlorinated acetone and (2) a product of partial condensation of ingredients comprising urea and formaldehyde while admixed with a small amount of alkaline material comprising ammonia and sodium hydroxide.

12. A composition containing the resinous product of reaction of ingredients comprising (1) a chlorinated acetone and (2) a partial condensation product of ingredients comprising urea and formaldehyde.

13. A composition containing the resinous product of reaction of ingredients comprising (1) a chlorinated acetone and (2) a product obtained by partial condensation of ingredients comprising urea and formaldehyde under alkaline conditions.

GAETANO F. D'ALELIO.